United States Patent [19]

Basgal

[11] Patent Number: 4,922,646

[45] Date of Patent: May 8, 1990

[54] FISHING LURE

[76] Inventor: Jerry Basgal, 9850 E. Hwy. 20, Clearlake Oaks, Calif. 95423

[21] Appl. No.: 290,185

[22] Filed: Dec. 23, 1988

[51] Int. Cl.⁵ .............................................. A01K 85/00
[52] U.S. Cl. .................. 43/42.33; 43/42.34; 43/42.35; 43/42.36; 43/42.48
[58] Field of Search ................. 43/42.33, 42.32, 42.34, 43/42.35, 42.36, 42.48, 42.1, 42.24, 42.25, 42.28

[56] References Cited

U.S. PATENT DOCUMENTS 2,641,080  6/1953  Wise ..................................... 43/42.33
3,031,792  2/1960  Swenson ............................. 43/42.33

OTHER PUBLICATIONS

"Variant" Light Reflecting Prisms—Bass Pro Shops, 1986 Catalog, p. 187.

Tube-U-Lure "Clear", Bass Pro Shops, 1986 Catalog, p. 140.

Primary Examiner—Nicholas P. Godici
Assistant Examiner—Mike Starkweather
Attorney, Agent, or Firm—Larry D. Johnson

[57] ABSTRACT

A fishing lure comprises an elongate, generally cylindrical body portion made of transparent or semi-transparent material, and terminates in a plurality of narrow elongate streamers forming a skirt portion. The body portion bears internal, and optionally external, longitudinal facets forming light-reflective and optically visible surfaces, which are felt to improve visible attraction to the fish, and therefore fishing success. The internal longitudinal facets are preferably formed by a minimum of three rectangular surfaces, defining a triangular internal cavity in the body member, to a maximum of approximately twelve rectangular surfaces, defining a dodecahedronal internal cavity.

6 Claims, 3 Drawing Sheets

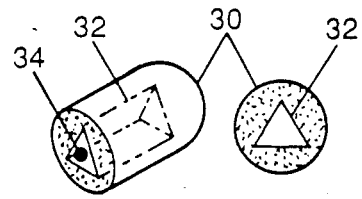
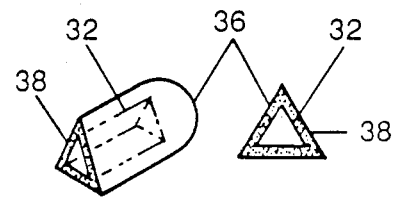
FIG. 4A.  FIG. 4B.    FIG. 5A.  FIG. 5B.
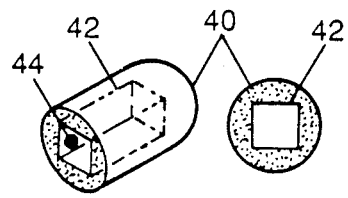
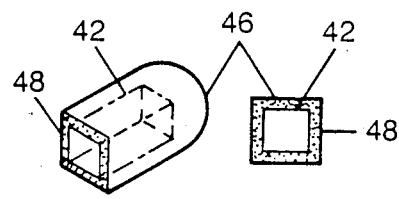
FIG. 6A.  FIG. 6B.    FIG. 7A.  FIG. 7B.
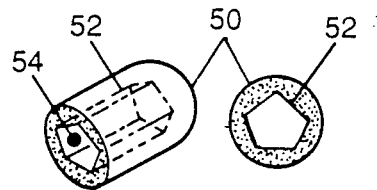
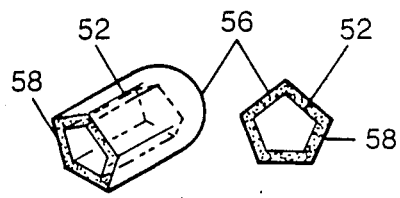
FIG. 8A.  FIG. 8B.    FIG. 9A.  FIG. 9B.

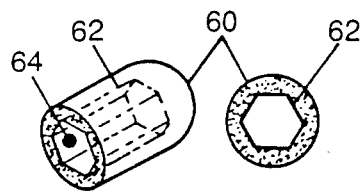 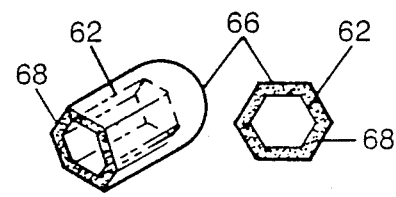
FIG. 10A.　FIG. 10B.　　　FIG. 11A.　FIG. 11B.
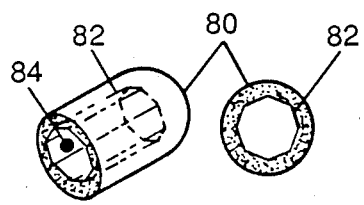 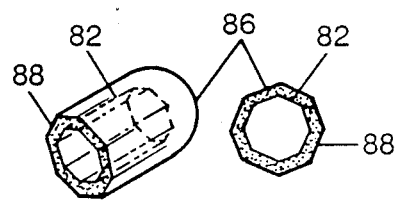
FIG. 12A.　FIG. 12B.　　　FIG. 13A.　FIG. 13B.
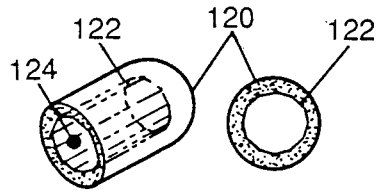 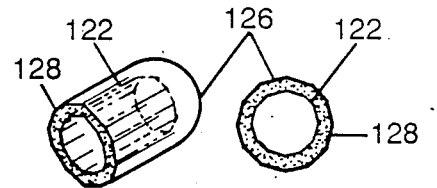
FIG. 14A.　FIG. 14B.　　　FIG. 15A.　FIG. 15B.

FISHING LURE

BACKGROUND OF THE INVENTION

1. Field of the Invention

This invention relates generally to sporting goods and other outdoor activity apparatus, and more specifically to an improved fishing lure device.

2. Description of the Prior Art

Fishing has been, and continues to be, a popular commercial and recreational activity. Most rod and reel type fishing requires the attachment of either live bait or an artificial lure to the fishing line to attract and hook the fish. Numerous artificial lure devices have been developed to increase the "luck" of the angler by providing a device that has the look and/or feel of the fishes' natural prey, such as minnows, insects or worms. Other artificial lures rely on visual attraction aspects only, such as brightly colored streamers, highly reflective spoons or the like. Still other artificial lures produce a distinctive sensory vibration that is supposedly attractive to the fish.

One popular artificial lure device provides an elongate, skirted body member made of vinyl or similar flexible material, with a fishing hook embedded in the body so that the barb of the hook is concealed by the body and skirt. However, such lures are not felt to be particularly visually attractive to fish.

SUMMARY OF THE INVENTION

The fishing lure of this invention provides an artificial lure member comprising an elongate, generally cylindrical body portion made of transparent or semi-transparent material, and terminating in a plurality of narrow elongate streamers forming a skirt portion. The lure's body portion bears internal, and optionally external, longitudinal facets forming light-reflective and optically visible surfaces, which are felt to improve visible attraction to the fish, and therefore fishing success. In the preferred embodiment, these facets extend essentially the entire length of the body portion. A standard fishing hook may be embedded into the body portion so that the hook's eyelet is proximate the head of the body, and the hook's barb is concealed by the body.

The internal longitudinal facets are preferably formed by a minimum of three rectangular surfaces, defining a triangular internal cavity in the body portion, to a maximum of approximately twelve rectangular surfaces, defining a dodecahedronal internal cavity. A body portion may also bear corresponding external light-reflective surfaces, e.g., three to approximately twelve, thereby yielding a "sculptured" cylindrical body portion for the fishing lure.

BRIEF DESCRIPTION OF THE DRAWINGS

FIG. 4a is a cutaway perspective view of a triangular internally faceted version of the fishing lure of this invention;

FIG. 4b is a lateral cross-sectional view of the triangular internally faceted version of the fishing lure of FIG. 4a;

FIG. 5a is a cutaway perspective view of a triangular internally and externally faceted version of the fishing lure of this invention;

FIG. 5b is a lateral cross-sectional view of the triangular internally and externally faceted version of the fishing lure of FIG. 5a;

FIG. 6a is a cutaway perspective view of the internally faceted version of the fishing lure of this invention;

FIG. 6b is a lateral cross-sectional view of the square internally faceted version of the fishing lure of FIG. 6a;

FIG. 7a is a cutaway perspective view of a square internally and externally faceted version of the fishing lure of this invention;

FIG. 7b is a lateral cross-sectional view of the square internally and externally faceted version of the fishing lure of FIG. 7a;

FIG. 8a, is a cutaway perspective view of a pentagonal internally faceted version of the fishing lure of this invention;

FIG. 8b, is a lateral cross-sectional view of the pentagonal internally faceted version of the fishing lure of FIG. 8a;

FIG. 9a is a cutaway perspective view of a pentagonal internally and externally faceted version of the fishing lure of this invention;

FIG. 9b, is a lateral cross-sectional view of the pentagonal internally and externally faceted version of the fishing lure of FIG. 9a;

FIG. 10a is a cutaway perspective view of a hexagonal internally faceted version of the fishing lure of this invention;

FIG. 10b is a lateral cross-sectional view of the hexagonal internally faceted version of the fishing lure of FIG. 10a;

FIG. 11a is a cutaway perspective view of a hexagonal internally and externally faceted version of the fishing lure of this invention;

FIG. 11b is a lateral cross-sectional view of the hexagonal internally and externally faceted version of the fishing lure of FIG. 11a;

FIG. 12a is a cutaway perspective view of an octagonal internally faceted version of the fishing lure of this invention;

FIG. 12b is a lateral cross-sectional view of the octagonal internally faceted version of the fishing lure of FIG. 12a;

FIG. 13a is a cutaway perspective view of an octagonal internally and externally faceted version of the fishing lure of this invention;

FIG. 13b is a lateral cross-sectional view of the octagonal internally and externally faceted version of the fishing lure of FIG. 13a;

FIG. 14a is a cutaway perspective view of a dodecahedronal internally faceted version of the fishing lure of this invention;

FIG. 14b is a lateral cross-sectional view of the dodecahedronal internally faceted version of the fishing lure of FIG. 14a;

FIG. 15a is a cutaway perspective view of a dodecahedronal internally and externally faceted version of the fishing lure of this invention; and FIG. 15b is a lateral cross-sectional view of the dodecahedronal internally and externally faceted version of the fishing lure of FIG. 15a.

DETAILED DESCRIPTION OF A PREFERRED EMBODIMENT

Figure 1:
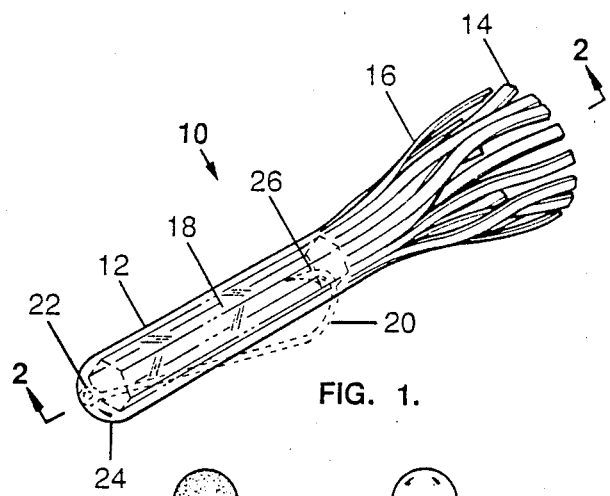
FIG. 1 is a perspective view of a hexagonal internally-faceted version of the fishing lure of this invention, with its installed fishing hook shown in phantom for environmental purpose.

FIG. 1 is a perspective view of a hexagonal internally-faceted version of the fishing lure of this invention. Artificial fishing lure member 10 comprises an elongate, generally cylindrical body portion 12 made of transparent or semi-transparent material, and terminating in a plurality of narrow elongate streamers 14 forming a skirt portion 16. The lure's body portion bears internal longitudinal facets 18 forming light-reflective and optically visible surfaces. In the preferred embodiment, these facets extend essentially the entire length of the body portion. A standard fishing hook 20 may be embedded into the body portion so that the hook's eyelet 22 is proximate head 24 of the body, and the hook's barb 26 is concealed by the body.

Figure 2:
FIG. 2 is a longitudinal cross-sectional view of the hexagonal internally-faceted version of the fishing lure of FIG. 1, this view being taken along line 2—2 of FIG. 1.

FIG. 2 is a longitudinal cross-sectional view of the hexagonal internally-faceted version 10 of the fishing lure of FIG. 1, this view being taken along line 2—2 of FIG. 1. This view illustrates three of the six internal facets 18.

Figure 3:
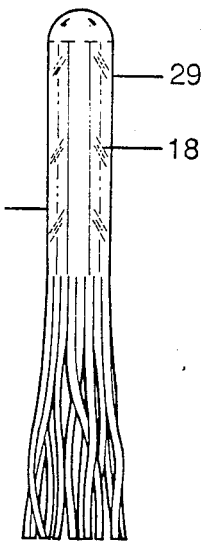
FIG. 3 is a side view of a hexagonal internally and externally faceted version of the fishing lure of this invention.

FIG. 3 is a side view of a hexagonal internally and externally faceted version 28 of the fishing lure of this invention. This view illustrates three of the six external facets 29, in addition to the internal facets 18.

FIGS. 4a through 15b provide a "table" illustrating the permutations of various numbers of internal facets with or without corresponding external facets.

FIG. 4a is a cutaway perspective view of a triangular internally faceted version 30 of the fishing lure of this invention. This version includes three longitudinally extending internal facets 32, defining a triangular central cavity 34. FIG. 4b is a lateral cross-sectional view of the triangular internally faceted version 30 of the fishing lure of FIG. 4a.

FIG. 5a is a cutaway perspective view of a triangular internally and externally faceted version 36 of the fishing lure of this invention. This version further includes three longitudinally extending external facets 38, defining a triangular external cross-section to the fishing lure. FIG. 5b is a lateral cross-sectional view of the triangular internally and externally faceted version 36 of the fishing lure of FIG. 5a.

FIG. 6a is a cutaway perspective view of a square internally faceted version 40 of the fishing lure of this invention. This version includes four longitudinal extending internal facets 42, defining a square central cavity 44. FIG. 6b is a lateral cross-sectional view of the square internally faceted version 40 of the fishing lure of FIG. 6a.

FIG. 7a is a cutaway perspective view of a square internally and externally faceted version 46 of the fishing lure of this invention. This version further includes four longitudinally extending external facets 48, defining a square external cross-section to the fishing lure. FIG. 7b is a lateral cross-sectional view of the square internally and externally faceted version 46 of the fishing lure of FIG. 7a.

FIG. 8a is a cutaway perspective view of a pentagonal internally faceted version 50 of the fishing lure of this invention. This version includes five longitudinally extending internal facets 52, defining a pentagonal central cavity 54. FIG. 8b is a lateral cross-sectional view of the pentagonal internally faceted version 50 of the fishing lure of FIG. 8a.

FIG. 9a is a cutaway perspective view of a pentagonal internally and externally faceted version 56 of the fishing lure of this invention. This version further includes five longitudinally extending external facets 58, defining a pentagonal external cross-section to the fishing lure. FIG. 9b is a lateral cross-sectional view of the pentagonal internally and externally faceted version 56 of the fishing lure of FIG. 9a.

FIG. 10a is a cutaway perspective view of a hexagonal internally faceted version 60 of the fishing lure of this invention. This version includes six longitudinally extending internal facets 62, defining a hexagonal central cavity 64. FIG. 10b is a lateral cross-sectional view of the hexagonal internally faceted version 60 of the fishing lure of FIG. 10a.

FIG. 11a is a cutaway perspective view of a hexagonal internally and externally faceted version 66 of the fishing lure of this invention. This version further includes six longitudinally extending external facets 68, defining a hexagonal external cross-section to the fishing lure. FIG. 11b is a lateral cross-sectional view of the hexagonal internally and externally faceted version 66 of the fishing lure of FIG. 11a.

FIG. 12a is a cutaway perspective view of an octagonal internally faceted version 80 of the fishing lure of this invention. This version includes eight longitudinally extending internal facets 82 defining an octagonal central cavity 84. FIG. 12b is a lateral cross-sectional view of the octagonal internally faceted version 80 of the fishing lure of FIG. 12a.

FIG. 13a is a cutaway perspective view of an octagonal internally and externally faceted version 86 of the fishing lure of this invention. This version further includes eight longitudinally extending external facets 88, defining an octagonal external cross-section to the fishing lure. FIG. 13b is a lateral cross-sectional view of the octagonal internally and externally faceted version 86 of the fishing lure of FIG. 13a.

FIG. 14a is a cutaway perspective view of a dodecahedronal internally faceted version 120 of the fishing lure of this invention. This version includes twelve longitudinally extending internal facets 122, defining a dodecahedronal central cavity 124. FIG. 14b is a lateral cross-sectional view of the dodecahedronal internally faceted version 120 of the fishing lure of FIG. 14a.

FIG. 15a is a cutaway perspective view of a dodecahedronal internally and externally faceted version 126 of the fishing lure of this invention. This version further includes twelve longitudinally extending external facets 128, defining a dodecahedronal external cross-section to the fishing lure. FIG. 15b is a lateral cross-sectional view of the dodecahedronal internally and externally faceted version 126 of the fishing lure of FIG. 15a.

Of course, a body portion bearing fewer than three internal facets would not define an internal cavity for the fishing lure, and would only reflect light in two directions, if at all. At the other extreme, it is felt that for most usable sizes of fishing lures, a body portion having a very large number of internal facets would result in facets too narrow (approximating a curve) to be useful in reflecting light, thereby defeating the purpose of the structure. Therefore, the preferred embodiments of this invention provide for from three to twelve internal (and optionally external) light-reflective surfaces, though of course a larger number of facets could be used.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A fishing lure comprising:
    an elongate, generally cylindrical body portion made of at least partially transparent material, and terminating in a plurality of elongate streamers forming a skirt portion; and
    a plurality of internal longitudinal rectangular and non-curved facets forming light-reflecting and optically visible surfaces within said body portion, said internal facets define an internal cavity in said body portion.

2. The fishing lure of claim 1 wherein said internal facets extend essentially the entire length of said body portion.

3. The fishing lure of claim 1 having between three and twelve internal facets.

4. The fishing lure of claim 3 having six internal facets.

5. The fishing lure of claim 1 further including a plurality of external longitudinally facets forming light-reflecting and optically visible surfaces on the outside of said portion.

6. The fishing lure of claim 5 wherein the number of said external facets equals the number of said internal facets.

* * * * *